United States Patent [19]

Louviot

[11] 4,240,456

[45] Dec. 23, 1980

[54] MODULAR ELEMENT FOR A HYDRAULIC FLOW DIVIDER UNIT

[75] Inventor: Jean F. Louviot, Saint Denis, France

[73] Assignee: Regie Nationale des Usines Renault, Boulogne-Billancourt, France

[21] Appl. No.: 1,752

[22] Filed: Jan. 8, 1979

[30] Foreign Application Priority Data

Jan. 16, 1978 [FR] France ............................... 78 01047

[51] Int. Cl.[3] ............................................ G05D 11/00

[52] U.S. Cl. .................................... 137/100; 137/501; 137/505.18; 137/884

[58] Field of Search ...................... 137/501, 505.18, 98, 137/100, 884

[56] References Cited

U.S. PATENT DOCUMENTS

| | | | |
|---|---|---|---|
| 2,313,797 | 3/1943 | Bailey | 137/100 |
| 2,606,066 | 8/1952 | Thompson | 137/100 |
| 2,662,541 | 12/1953 | Noon | 137/100 |
| 3,530,883 | 9/1970 | Kramer | 137/884 |
| 3,750,707 | 8/1973 | Dordoni | 137/884 |
| 3,818,921 | 6/1974 | Peczkowski | 137/505.18 |
| 3,847,172 | 11/1974 | Guy | 137/100 |
| 3,915,194 | 10/1975 | Friedrich | 137/884 |
| 3,976,098 | 8/1976 | Raymond | 137/884 |

FOREIGN PATENT DOCUMENTS

| | | | |
|---|---|---|---|
| 2356414 | 5/1975 | Fed. Rep. of Germany . | |
| 2513545 | 10/1975 | Fed. Rep. of Germany | 137/884 |
| 1484990 | 9/1977 | United Kingdom . | |

*Primary Examiner*—William R. Cline
*Assistant Examiner*—H. Jay Spiegel
*Attorney, Agent, or Firm*—Oblon, Fisher, Spivak, McClelland & Maier

[57] ABSTRACT

The stackable modular element for a flow divider unit for a hydraulic circuit has a flow regulator with a piston controlling an opening as a function of the variations in the pressure upstream between the fluid input and output. The internal cylinder of the regulator piston (11, 111, 211) opens, on the one hand, onto a stacking face of the element and, on the other, into the exit hole (5, 105, 205) of the element, passing through its entry hole (3, 103, 203) and communicates, via the said stacking face, with a passage (12, 112, 212) for equalization of output pressures traversing the element between its stacking faces and connecting them with the corresponding passages in the adjoining units, the equalization passage communicating, in addition, with the exit hole (5, 105, 205) of the element.

5 Claims, 2 Drawing Figures

MODULAR ELEMENT FOR A HYDRAULIC FLOW DIVIDER UNIT

BACKGROUND OF THE INVENTION

The present invention relates to the filed of high-pressure hydraulic circuits and, in particular, to the control of hydraulic jacks or motors from a common supply line, the outputs of which must then be divided as a function of each device supplied, assuring them a constant flow regardless of their load variations.

SUMMARY OF THE INVENTION

The object of the invention is a configuration of flow dividers permitting, by means of modules stackable in any number, the dividing up of a supply circuit while maintaining flow equality in spite of individual load variations and regardless of the number of divisions realized.

Each of these modules has a spool sliding against a spring which, as in known flow regulators, adjusts its position and the opening of the flow passage that it controls as a function of the variations of downstream pressure, and thus of the load of the device supplied.

BRIEF DESCRIPTION OF THE DRAWINGS

Various other objects, features and attendant advantages of the present invention will be more fully appreciated as the same becomes better understood by the accompanying drawings in which like reference characters designate like or corresponding parts throughout the several views, and wherein.

DETAILED DESCRIPTION OF THE PREFERRED EMBODIMENTS

Figure 1:
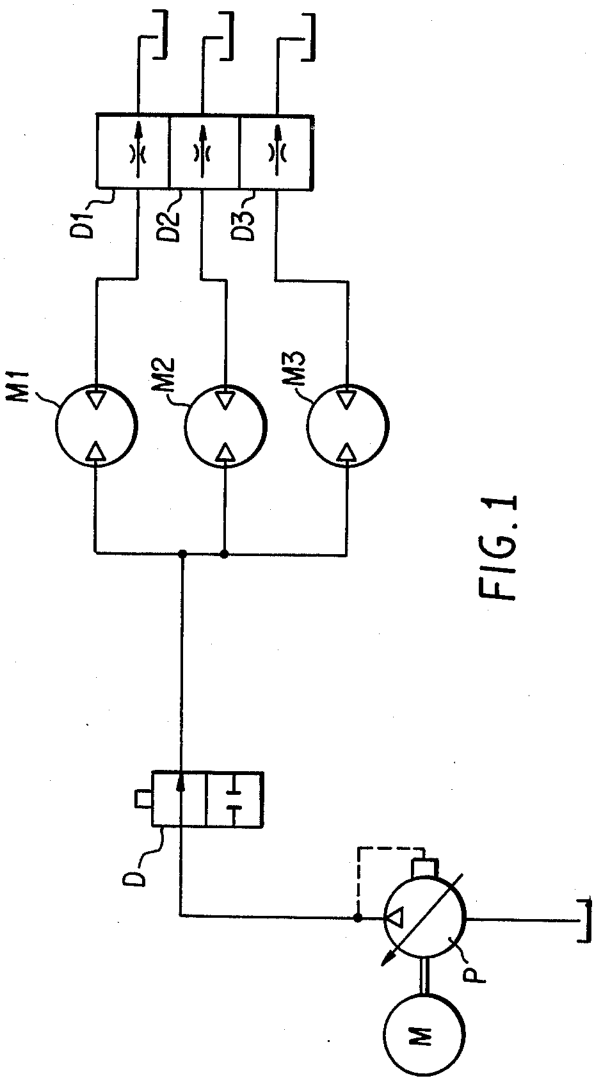
FIG. 1 shows an example of placement of three of these modular elements in relation to the devices which they control.
Figure 2:
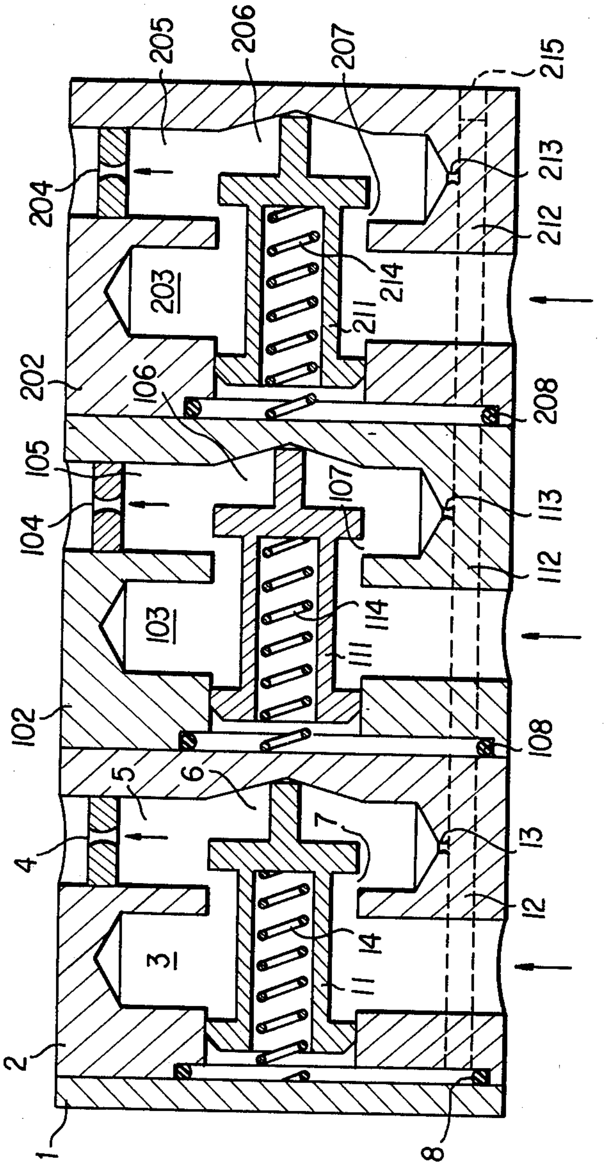
FIG. 2 is a transverse section through a stack of three modular elements.

As is seen in these figures, the stackable modular element for the hydraulic flow divider unit of the invention has a flow regulator with a piston controlling the flow passage as a function of variations in the pressure upstream between the fluid input and output. It is characterized by the fact that the cylinder of the regulator piston 11, 111, 211 opens at one end onto a stacking face of the element and projects at the other end into the exit hole 5, 105, 205 of the element while passing through its entry hole 3, 103, 203 and communicates, via the said stacking face, with an output pressure equalization passage 12, 112, 212 traversing the element between its stacking faces and connecting them with the corresponding passages in the adjoining units, the said equalization passage communicating, in addition, with the exit hole 5, 105, 205 of the element.

The exit hole 5, 105, 205 has its orifice closed by a removable throat 4, 104, 204 chosen as a function of the operating flow.

At rest, in the absence of flow, a spring 14, 114, 214 resting against the stacking face of the adjoining element pushes the regulator piston 11, 111, 211 to rest against the wall of the exit hole 5, 105, 205, putting the latter into full communication with the entry hole 3, 103, 203.

The contact faces of the stacked elements have a milled out depression into which opens the cylinder of the regulator piston 11, 111, 211 and the output pressure equalization passage 12, 112, 212, thus putting them into communication.

This depression is provided with sealing means 8, 108, 208 between the stacking faces, e.g. O-rings.

The external faces of the end elements of the stack are closed, on the one hand, by a plate 1 covering the face where the cylinder opens out and, and on the other, by a plug 215 closing off the end of the output pressure equalization passage 12, 112, 212.

Each module also has a body 2, 102, 202 in which slides the piston 11, 111, 211 in contact with the spring 14, 114, 214, the removable throat 4, 104, 204 at the output of each module, depending on the flow to the device supplied, and a fixed throat 13, 113, 213 likewise at the output downstream end of the piston and opening into the elements 12, 112, 212 of the pressure equalization passage assuring the same pressure at the ends of the pistons against which the springs press. O-ring seals 8, 108, 208 provide sealing of the passages opening at the stacking faces.

A plate 1 covers the end of the last module in the stack.

The body of each module is a parallelepiped block in which four borings are made:

- a boring 6, 106, 206 in which the piston 11, 111, 211 slides,
- a boring 3, 103, 203 by which the fluid enters,
- a boring 5, 105, 205 by which it leaves,
- a boring 12, 112, 212 putting into communication, via a milled out depression receiving the O-ring seals 8, 108, 208, the opening at the left end of the piston 11, 111, 211 and the passage 12, 112, 212.

The schematic in FIG. 1 shows a pump P, a distributor D, three hydraulic motors M1, M2, M3 and the divider of the invention which divides into three equal parts the supply flow of these motors by control of their output flow. If one of these motors is less loaded than the other, its speed increases. The pressure at the input of the divider then likewise increases.

The force of the springs being negligible (i.e. the springs for opening the regulator when not functioning), the left-hand cavities of the pistons where these springs are located are all at the pressure of the passage 12, 112, 212 which finds itself at the mean of the pressures downstream of the pistons in 6, 106, 206. The orifices of the removable constrictions 4, 104, 204 are all identical, the flows having been chosen equal in the example described.

In order for the pistons to be in equilibrium, it is necessary that the pressures in 6, 106, 206 be equal to those in 12, 112, 212. If one of these pressures tends to rise above the others, the piston will be pushed leftwards against its spring until this pressure again becomes identical to the others because of its increased pressure drop. The pressures in 6, 106, 206 being identical, the flows through the holes 4, 104, 204 will be identical.

With different diameter holes at 4, 104, 204, one can divide their respective flows in proportion to the sectional areas of these holes.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A stack of stackable modular elements for a hydraulic flow divider, each said element comprising:

a transverse bore in said element;

a stacking face in said element at one end of said transverse bore, said stacking face including a milled out depression and contacting an opposing end of an adjacent element in said stack;

an exit hole in said element at the other end of said transverse bore;

an entry hole in said element at a midportion of said bore;

an outlet pressure equalization hole passing transversely through said element from said depression of said stacking face, said outlet pressure equalization hole communicating with said exit hole, said outlet pressure equalization hole extending to the face of each said element opposing said stacking face of each said element and thereby communicating with the stacking face and outlet pressure equalization hole of the adjacent element at said opposing end in said stack; and a piston received in said transverse bore and adapted to move so as to regulate the flow opening between said entry hole and said exit hole, said piston having an internal cylinder which opens into said milled out depression of said stacking face and communicating with said outlet pressure equalization hole via said milled out portion of said stacking face, said cylinder traverses said entry hole and projects into said exit hole, said piston having a face in said exit hole exposed to the pressure in said exit hole;

wherein said piston is movable as a function of the variations in the pressure between said exit hole pressure and the pressure in said milled out portion.

2. Modular element as in claim 1, characterized by the fact that said exit hole has its orifice closed by a removable constriction chosen as a function of the supply flow.

3. Modular element as in claim 1, characterized by the fact that at rest, in the absence of flow, a spring resting against the adjoining stacking face of said element pushes said piston against the wall of said exit hole putting it in full communication with said entry hole.

4. Modular element as in claim 1, characterized by the fact that said milled out depression is provided with sealing means between said elements.

5. Modular element as in claim 1, characterized by the fact that the external faces of the end elements of said stack are closed, on the one hand, by a plate covering the face where the cylinder opens and, on the other, by a plug closing the exit of the output pressure equalization hole.

* * * * *